April 16, 1957     W. G. ANGLE     2,788,653
CORNER BEAD GAUGE AND PLUMB
Filed March 31, 1954     2 Sheets-Sheet 1
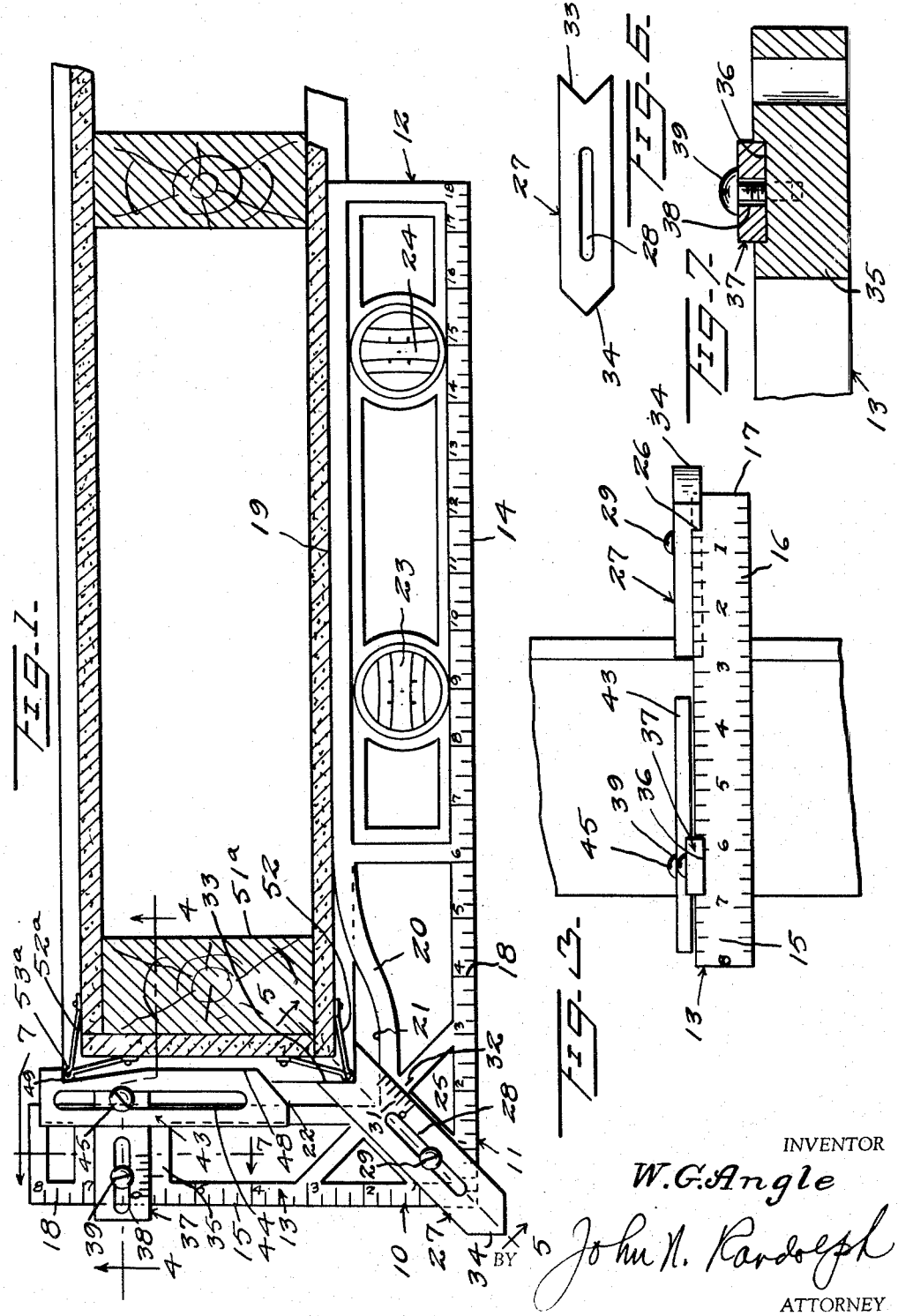
INVENTOR
W. G. Angle
BY John N. Randolph
ATTORNEY April 16, 1957 W. G. ANGLE 2,788,653
CORNER BEAD GAUGE AND PLUMB
Filed March 31, 1954 2 Sheets-Sheet 2
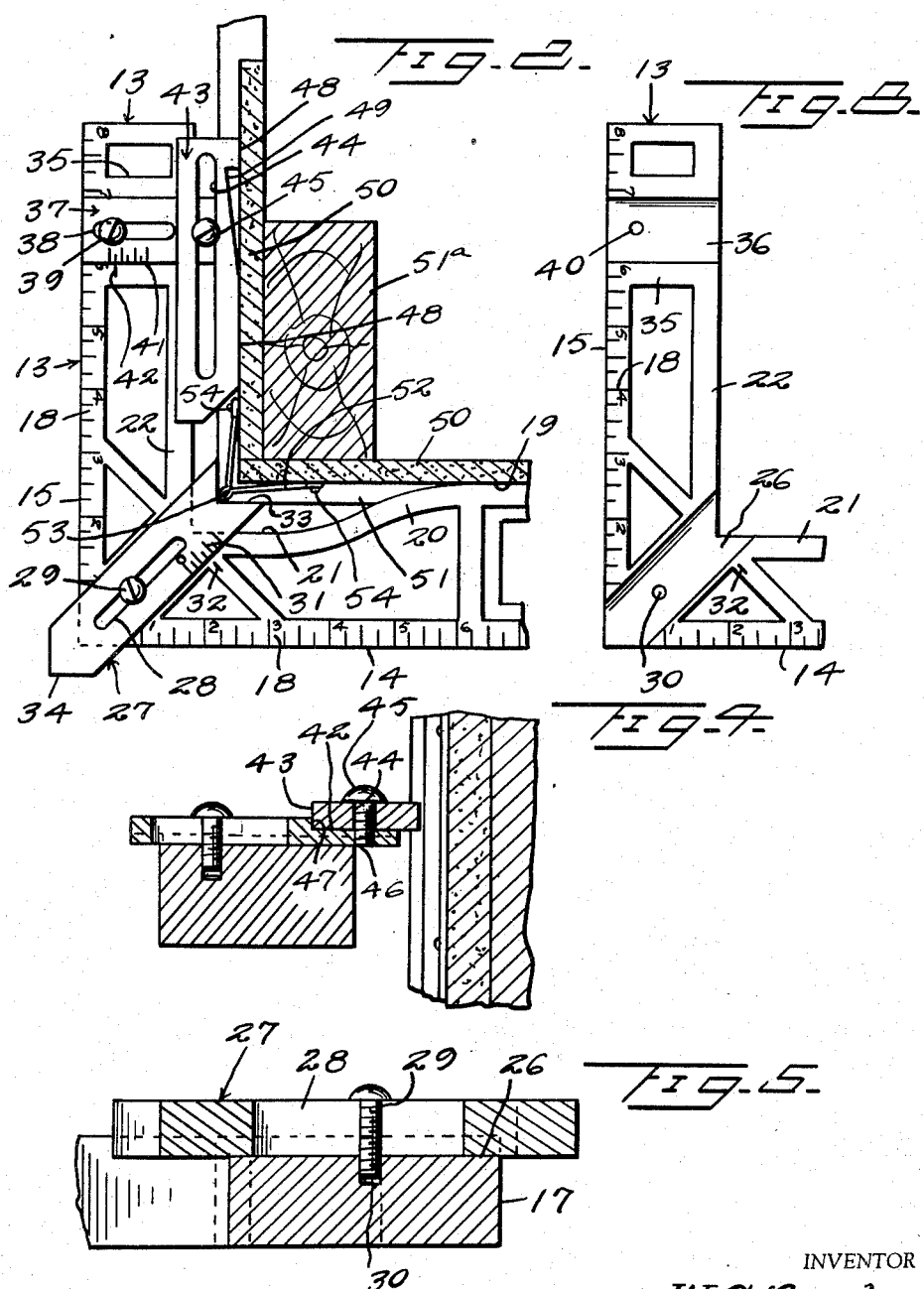
INVENTOR
W. G. Angle
BY John H. Randolph
ATTORNEY

United States Patent Office 2,788,653
Patented Apr. 16, 1957

2,788,653

CORNER BEAD GAUGE AND PLUMB

Wallace G. Angle, Rocky Mount, Va.

Application March 31, 1954, Serial No. 420,152

3 Claims. (Cl. 72—128)

This invention relates to an instrument for use as a combination gauge and plumb for applying corner pieces to walls with the beads thereof spaced a proper distance from a partially completed wall corner.

More particularly, it is an aim of the present invention to provide a corner bead gauge and plumb by means of which corner pieces can be quickly applied to corners of partially completed walls with the beads thereof accurately positioned from top to bottom of the wall corner in a vertical position and uniformly spaced from the partially completed wall corner.

Another object of the invention is to provide such an instrument which is so constructed that two corner pieces can be simultaneously placed, as for example in locating the corner pieces for an archway or wall opening.

A further object of the invention is to provide an instrument of the aforedescribed character which may be additionally used as a square and level.

Other objects and advantages of the invention will hereinafter become more fully apparent from the following description of the drawings, illustrating a presently preferred embodiment thereof, and wherein:

Figure 1 is a top plan view showing the gauge in an applied position for simultaneously positioning two corner pieces;

Figure 2 is a fragmentary top plan view of the gauge shown adjusted for positioning a single corner piece;

Figure 3 is an end elevational view of the gauge looking from left to right of Figure 1;

Figure 4 is an enlarged sectional view taken transversely through the shorter arm of the gauge, substantially along a plane as indicated by the line 4—4 of Figure 1;

Figure 5 is an enlarged sectional view taken substantially along a plane as indicated by the line 5—5 of Figure 1;

Figure 6 is a plan view of one element of the gauge shown removed from the complete instrument;

Figure 7 is an enlarged sectional view taken longitudinally through a portion of the shorter gauge arm, substantially along a plane as indicated by the line 7—7 of Figure 1, and Figure 8 is a fragmentary plan view of a portion of the square forming the frame of the gauge with removable parts thereof detached.

Referring more specifically to the drawings, the corner bead gauge and plumb in its entirety and comprising the invention is designated generally 10 and includes a square, designated generally 11, having a relatively long arm 12 and a shorter arm 13. The arms 12 and 13 are of openwork construction, as clearly illustrated in Figure 1, and have outer edges 14 and 15, respectively, forming a right angle and which merge at the apex of the frame or square 11. Said outer edges 14 and 15 are provided with graduations forming linear scales 16, as illustrated in Figure 3 which are numbered outwardly along said arms 12 and 13 from the apex 17 of the frame. The upper surfaces of the arms 12 and 13 along their outer edges 14 and 15 are provided with similar linear scales 18.

The longer arm 12 has an inner edge portion 19, disposed parallel to its outer edge 14 and extending from its outer end to a point spaced from the inner end of the arm 12, from which point the inner edge 19 is bowed inwardly as seen at 20 to provide a recessed bight portion 21. The inner edge portion 22 of the shorter arm 13 is disposed parallel to the outer edge 15 thereof and is laterally spaced from said edge 15, a distance less than the spacing between the outer edge 14 and inner edge 19 of the longer arm 12. The edge 22 merges with the recessed bight portion 21 of the arm 12 at a point forming an apex or intersecting point between the edge portion 22 and a line which would extend parallel between the outer and inner edges 14 and 19 of the longer arm 12.

The longer arm 12, between its edges 14 and 19, is of openwork construction and contains two conventional spirit levels 23 and 24 of the type wherein an air bubble floats in a transparent tube. The longitudinal axis of the level 23 is disposed longitudinally of the arm 12 while the longitudinal axis of the level 24 is disposed transversely of said arm 12, the axes of both spirit level tubes being disposed in the plane of the arm 12.

The exact interior construction of the arms 12 and 13 may be varied considerably as to the openwork construction thereof. However, the square or frame 11 is provided with a solid portion 25 at the apex of said arms 12 and 13 and which extends inwardly from the apex 17 at an oblique angle to the axes of the arms 12 and 13. Said solid intermediate portion 25 is provided with a relatively wide groove or channel 26 the center of which intersects with the apex 17 and with the intersection of the inner edge 22 and recessed bight portion 21. A bar 27 forming a gauge element is slidably mounted in the groove or channel 26 and is provided with an elongated slot 28 which is disposed axially of said bar. The shank of a headed screw 29 loosely engages said slot 28 and threadedly engages a recess 30 in the bed of the channel 26. The gauge bar 27 is slidably movable in the channel 26, when the screw 29 is loosened, in directions inwardly or outwardly relatively to the apex of the square or frame 11, and is retained against lateral or turning movement by engagement of its side edges with the side walls of the channel 26. The screw 29 can be tightened for clamping the gauge bar 27 between the screw head and the bed of the channel 26 to retain said gauge bar in any desired adjusted position. The upper side of the gauge bar is provided with a linear scale preferably graduated in eighths of an inch, as seen at 31, which functions with an index line 32 located on a portion of the upper side of the frame 11 to one side of the channel 26. The inner end of the gauge bar 27 is defined by a V-shaped notch 33 the sides of which form a right angle, one of which is disposed parallel with the inner edge 19 of the long arm 12 and the other of which is disposed parallel with the inner edge 22 of the short arm 13. The outer arm of the bar 27 forms a V-shaped tapered point 34, the sides of which likewise form a right angle, one of which is disposed parallel to the outer edge 14 and the other of which is disposed parallel to the outer edge 15. By moving the bar 27 to its innermost position, so that the outer end of the slot 28 is in engagement with the shank of the screw 29, the sides forming the point 34 will be disposed flush with the outer edges 14 and 15 of the frame 11, so that said outer edges can be efficiently employed as a square.

As best seen in Figure 8, the shorter arm 13 has a solid transverse portion 35 in the upper side of which is formed a transverse channel 36. A slide bar 37 fits relatively snug in the channel 36 and is slidably movable only transversely of the arm 13. The slide bar 37 has a longitudinally extending slot 38 through which the shank of a headed screw 39 loosely extends. The screw 39 threadedly engages an opening 40 in the arm portion 35 and is adapted to be tightened therein to adjustably clamp the slide bar 37, in the same manner that the gauge bar 27 is clamped by the screw 29. The upper side of the slide bar 37 is provided with a linear scale having graduations preferably spaced one eighth of an inch apart and which scale 41 functions with an indexing line 42 provided on the upper surface of the arm portion 35. The slide bar 37 has its upper side recessed at its inner end, as seen in Figure 4, to accommodate an elongated longitudinal gauge bar 43 which fits slidably in said recess 42 of the slide bar 37. The longitudinal gauge bar 43 has an elongated longitudinally extending slot 44 to slidably engage a shank of a headed screw 45 which threadedly engages a threaded opening 46, formed in the bar 37 below its recessed portion 42. The longitudinal gauge bar 43 is maintained by engagement of its slot 44 with the shank of the screw 45 so that its inner longitudinal edge is disposed against the inner wall 47 of the recess 42, to maintain the outer longitudinal edge 48 of the bar 43 parallel to the inner edge 22 of the arm 13. The bar 43 is provided with a notch 49 which opens outwardly of its outer edge and which includes a transverse outer end portion.

Referring to Figure 2, the instrument 10 is shown in conjunction with a corner of a partially finished wall including rock lath strips 50 or the like which are secured to a stud 51a. A wood ground or the like 51 projects outwardly from the rock lath pieces 50 just above the floor level and the spacing of its outer edges from the outer surface of the rock laths 50 represents the thickness of the plaster to be applied over the rock lath. A conventional corner piece 52 is applied to the corner formed by the rock lath pieces 50 and the bead 53 of said corner piece 52 must be disposed at the apex of the wood ground 51. The instrument 10 is employed for accomplishing the setting of the corner piece 52. For this use of the instrument, the slide bar 37 is adjusted and tightened in the channel 36 so that the one-eighth inch graduation thereof located next to the zero graduation of the scale 41 will align with the index mark 42 to position the outer edge 48 of the longitudinal bar 43 spaced the same distance from the outer arm edge 15 as the inner edge 19 of the arm 12 is spaced from the outer edge 14. The frame or square 11 can then be placed with the edges 19 and 48 against the two rock lath pieces 50 forming right angle, and when so disposed, the axis of the center gauge bar 27 will align with the apex of the wall members 50. Assuming that the wood ground 51 extends three-eighths of an inch out from the wall members 50, the center gauge bar 27 is adjusted until its three-eighth inch graduation 31 aligns with the index mark 32 and is secured by the fastening 29 in this position. The two sides of the notch 33 will then be in vertical alignment with the two edges of the wood ground 51. If preferred, the sides of the notch 33 may be thus aligned with the edges of the wood ground 51 by positioning the instrument 10 as previously described and just above the wood ground 51 and by aligning the sides of the notch 33 with the edges of the wood ground without the use of the scale 31. The bead 53 is then positioned in engagement with the apex of the notch 33 and the sides of the corner piece 52 are then secured by fastenings 54. This is first accomplished near the wood ground 51 after which the instrument is moved upwardly about a foot and the operation repeated at foot intervals from bottom to top of the wall, for accurately locating the bead 53 vertically and directly above the corner of the wood ground. Much time can be saved in the use of the instrument 10 in this manner to accurately locate the corner piece 52.

The instrument 10 can also be employed as illustrated in Figure 1 for simultaneously positioning two corner pieces 52 and 52a, as where an archway opening is being formed in a wall. When thus employed, the slide bar 37 is adjusted to the three-eighth inch graduation of its scale 41 and secured in this position by the fastening 39, still assuming that the wood ground projects three-eighths of an inch from the rock lath 50. The fastening 45 is then loosened for adjusting the longitudinal bar 43 longitudinally of the shorter frame arm 13 and said fastening 45 is thereafter tightened when the notch 49 has its apex located directly over the other corner of the ground 51 and so that the bead 53a may be seated in the notch 49 to position said bead in vertical alignment with the second wood ground corner. The operation as previously described is then repeated except that each time that the instrument 10 is positioned in different vertical positions, both corner pieces 52 and 52a are secured by the fastenings 54. Thus, as illustrated in Figure 1, the gauge instrument 10 may be simultaneously utilized for positioning two corner pieces.

The levels 23 and 24 are employed to properly position the frame 11 in a horizontal position when the instrument is used for positioning either one or two corner pieces.

Various modifications and changes are contemplated and may obviously be resorted to, without departing from the spirit or scope of the invention as hereinafter defined by the appended claims.

I claim as my invention:

1. An instrument of the character described comprising a frame including an elongated arm having an elongated inner straight edge adapted to be disposed flush against a vertical wall member and with said arm disposed in a horizontal plane, a gauge bar slidably supported by said frame and disposed with its axis forming an oblique angle with said straight edge, means limiting sliding movement of said gauge bar in directions only axially thereof, said gauge bar having a notched inner end the sides of which form a right angle, one of which is disposed parallel to said straight edge, and means adjustably clamping said gauge bar to the frame with said side of the notch set back a predetermined distance from said straight edge for locating the apex of said notch a predetermined distance outwardly of a corner of the wall member against which said straight edge is disposed, said apex of the notch providing a seat for the bead of a corner piece to position the corner piece bead a predetermined distance outwardly from the corner of said wall member, said frame including a second arm disposed at a right angle to the first mentioned arm and combining therewith to form a square, said gauge bar being disposed at the apex of said square and intersecting the angle formed by said arms, said second arm including a part having an inner straight edge adapted to abut another wall member disposed at a right angle to the wall member engaged by said straight edge of the first arm, said straight edges having adjacent ends spaced from the notched inner end of the gauge bar, said straight edges being disposed in planes intersecting at a point in alignment with the axis of said gauge bar, said second arm having an elongated bar disposed longitudinally thereof having one longitudinal edge forming said straight edge of the second arm, said longitudinal bar having a notch opening outwardly of said straight edge including a side disposed transversely of the longitudinal bar and facing toward an inner end thereof, and means slidably connected to said second arm and movable transversely thereof on which said longitudinal bar is supported for adjustment transversely of the second arm to position the apex of the notch thereof a distance from a corner of the last mentioned wall member corresponding to the spacing of the notch of said gauge bar from the corner of the first mentioned wall member, whereby the bead of a second corner piece may be seated in the notch of said longitudinal bar and positioned thereby a desired distance from the last mentioned wall member corner.

2. An instrument as in claim 1, and means slidably supporting said longitudinal bar for sliding movement relatively to said aforementioned means in a direction longitudinally of the second arm for varying the spacing between said corner bead engaging notches.

3. An instrument as in claim 2, said frame including spirit levels disposed coplanar therewith and having their longitudinal axes disposed longitudinally and transversely of said arms for indicating when said frame is disposed in a horizontal plane.

References Cited in the file of this patent
UNITED STATES PATENTS

| | | |
|---|---|---|
| 1,549,947 | Wolfe | Aug. 18, 1925 |
| 2,269,266 | Hammerl | Jan. 6, 1942 |
| 2,314,927 | Farrington | Mar. 30, 1943 |
| 2,420,350 | Brown | May 13, 1947 |